United States Patent
Hind et al.

(10) Patent No.: US 8,832,276 B2
(45) Date of Patent: Sep. 9, 2014

(54) BYPASSING CONTENT BLOCKING

(75) Inventors: John R. Hind, Raleigh, NC (US); Marcia L. Stockton, Bakersfield, CA (US)

(73) Assignee: International Business Machines Corporation, Armonk, NY (US)

( * ) Notice: Subject to any disclaimer, the term of this patent is extended or adjusted under 35 U.S.C. 154(b) by 2051 days.

(21) Appl. No.: 10/643,601

(22) Filed: Aug. 18, 2003

(65) Prior Publication Data

US 2005/0044185 A1    Feb. 24, 2005

(51) Int. Cl.
G06F 15/173    (2006.01)
G06F 15/16    (2006.01)
G06F 17/30    (2006.01)
H04L 29/06    (2006.01)
H04L 29/08    (2006.01)

(52) U.S. Cl.
CPC .......... *G06F 17/30699* (2013.01); *H04L 29/06* (2013.01); *H04L 67/2804* (2013.01); *H04L 67/02* (2013.01); *H04L 67/2895* (2013.01); *H04L 69/329* (2013.01); *H04L 67/2823* (2013.01); *G06F 17/30905* (2013.01)
USPC .......................................... 709/227; 709/224

(58) Field of Classification Search
USPC .................. 709/223–227, 203, 217
See application file for complete search history.

(56) References Cited

U.S. PATENT DOCUMENTS

| | | | |
|---|---|---|---|
| 5,715,462 A * | 2/1998 | Iwamoto et al. | 717/173 |
| 6,226,677 B1 | 5/2001 | Slemmer | 709/227 |
| 6,286,001 B1 | 9/2001 | Walker et al. | 707/9 |
| 6,321,256 B1 | 11/2001 | Himmel et al. | 709/218 |
| 6,397,246 B1 * | 5/2002 | Wolfe | 709/217 |
| 6,477,575 B1 * | 11/2002 | Koeppel et al. | 709/224 |
| 6,694,352 B1 * | 2/2004 | Omoigui | 709/205 |
| 6,912,571 B1 * | 6/2005 | Serena | 707/10 |
| 7,058,633 B1 * | 6/2006 | Gnagy et al. | 707/10 |
| 7,110,407 B1 * | 9/2006 | Khanna | 370/392 |
| 7,444,369 B1 * | 10/2008 | Schumacher | 709/203 |
| 2001/0049701 A1 * | 12/2001 | Howerton et al. | 707/513 |
| 2002/0010757 A1 * | 1/2002 | Granik et al. | 709/218 |
| 2002/0077930 A1 * | 6/2002 | Trubey et al. | 705/26 |
| 2002/0078191 A1 | 6/2002 | Lorenz | 709/223 |
| 2002/0095415 A1 | 7/2002 | Walker et al. | 707/9 |
| 2002/0099852 A1 * | 7/2002 | Fischer | 709/246 |
| 2002/0161835 A1 | 10/2002 | Ball et al. | 709/203 |
| 2002/0169890 A1 * | 11/2002 | Beaumont et al. | 709/245 |
| 2002/0191619 A1 * | 12/2002 | Shafer | 370/401 |
| 2003/0037250 A1 | 2/2003 | Walker et al. | 713/200 |
| 2003/0061515 A1 * | 3/2003 | Kindberg et al. | 713/201 |

(Continued)

OTHER PUBLICATIONS

How to insert META tags Oct. 8, 1999 www.acky.net/html/meta.sht.*

(Continued)

*Primary Examiner* — Joshua Joo
(74) *Attorney, Agent, or Firm* — Steven M. Greenberg, Esq.; CRGO Law

(57) ABSTRACT

A method for circumventing the operation of content blocking logic in a markup language document delivery system. In the method of the invention, the operation of content blocking logic can be determined. Responsive to this determination, a reference to content disposed in markup can be located and the reference to the content can be replaced with an alias. Finally, the markup can be served to a requesting browser. In this way, the replacement of the reference with the alias circumvents the operation of the content blocking logic.

20 Claims, 3 Drawing Sheets

(56) References Cited

U.S. PATENT DOCUMENTS

| | | | | |
|---|---|---|---|---|
| 2003/0065739 | A1 | 4/2003 | Shnier | 709/217 |
| 2004/0172468 | A1* | 9/2004 | Cai et al. | 709/224 |
| 2005/0010662 | A1* | 1/2005 | Prabhakar et al. | 709/224 |
| 2006/0248452 | A1* | 11/2006 | Lambert et al. | 715/513 |
| 2012/0136965 | A1* | 5/2012 | Matz | 709/217 |

OTHER PUBLICATIONS

Bill Dimm, How Ad-Blocking Software Works, SaveTheFreeWeb.com (Apr. 23, 2001).

How Ad-Blocking Works, Guidescope, Inc. <www.guidescope.com/gman/blockwork.htm> visited Jul. 2, 2003.

Sebastian Rupley, AOL Adds Pop-Up Ad Blocking, PC Magazine (Mar. 13, 2002).

Harry Bruinius, Crashing the Party—The Threat of Ad-Blocking Software, Jupitermedia Corporation (May 3, 2001).

@Man aka Word-Class Data Snuggler, Web Ad Blocking Under Linux/Unix, BeOS, MacOS and Windows, California State University at Chico (Feb. 20, 2000).

Better Ad Blocking for Mozilla and Netscape 7, <www.floppymoose.com> visited Jul. 2, 2003.

Richard Lowe and Claudia Arevalo-Lowe, Ad Blocking, <internet-tips.net/Security/adblocking.htm> visited Jul. 2, 2003.

Tom Hespos, The Dilemma of Ad-Blocking Software, INT Media Group, Incorporated (Apr. 19, 2001).

Your Browser's Cache, Guidescope, Inc. <www.guidescope.com/gman/cache.htm> visited Jul. 2, 2003.

* cited by examiner

BYPASSING CONTENT BLOCKING

BACKGROUND OF THE INVENTION

1. Statement of the Technical Field

The present invention relates to the field of Internet security and more particularly to content filtering.

2. Description of the Related Art

The global Internet represents the most substantial development in advertising since the advent of the television. Prior to the widespread adoption of the World Wide Web over the global Internet, media outlets had been restricted to print, radio and television advertising. In most cases, targeted individuals had no choice but to view the advertisements. As an example, in television broadcasting, advertisements can be included in a broadcast stream as additional content which can be indistinguishable from broadcast programming. Still, it will be of note that in the context of television broadcasting, advanced digital recording devices have proven successful in partially or entirely removing advertisements from recorded television programs despite the indistinguishable nature of the advertisement.

Unlike the television broadcasting medium, in the Internet medium advertisements are often delivered as embedded elements of markup defining an electronic document. Markup languages are well-known in the art and include not only the venerable hypertext markup language (HTML), but also extensible markup language (XML), wireless markup language (WML), and numerous variants of the standardized generalized markup language (SGML), to name a few. As will be recognized by the skilled artisan, such electronic documents include Web pages, among other forms of displayable content. A markup language document can define not only that content which can be viewed through a content browser such as a Web browser (herein referred to as a "browser"), but also supplemental content which can be presented in association with the content.

Content which is supplemental to the markup can include not only advertisements (typically in the form of embedded image references), but also embedded references to media, references to other markup language documents, markup language fragments, other types of documents, programs, scripts, and the like. In this regard, supplemental content is any content which can be loaded by or with the assistance of a browser based upon the markup in which a reference to the supplemental content has been embeded. Examples can include an image reference which can be loaded automatically, or a script or page which can be activated responsive to a user event such as when a user passes a mouse pointer over a specified portion of the markup as rendered in the browser.

In operation, when a browser retrieves markup, the browser can parse the markup to render the document. In particular, for each reference to content referenced within the markup, the browser can retrieve the referenced content and can subsequently render the content within or in association with the markup as specified by the reference. Importantly, it is well-known to interpose a reverse proxy server (surrogate) between sources of content and markup and the browser for both security and efficiency reasons. In particular, the reverse proxy server can serve the supplemental content referenced within markup. Thus, as it will be apparent to the skilled artisan, the surrogate is positioned to know the true location of supplemental content requested by individual browsers in the course of rendering markup.

As is the case in television broadcasting, many in the targeted audience would prefer not to be inundated with advertisements while browsing. Moreover many would prefer to restrict the rendering of supplemental content. The market has responded to this known preference through the development of content blocking technology. Filtering represents one embodiment of such content blocking technology. In particular, filtering involves the association of portions of a uniform resource identifier (URI) with known sources of undesirable content. Consequently, each time the browser (or a forward proxy server acting on behalf of the browser, as the case may be) identifies a known source string within a URI referring to content, the request for the content can be ignored and the content can be omitted when rendering the markup. As a result, the blocked content will never be fetched, cached, displayed, or seen by the user. In fact, the blocked content simply fails to reach its target audience.

Initially, content blocking technology was adopted only by technically sophisticated early adopters, representing a relatively small percentage of the on-line population. Most experts recognize that the content blocking would be more widely adopted if its functionality were packaged with other Web oriented software. Presently the integration of content blocking technology within other Web oriented products has begun, as will be evidenced by the inclusion of some sort of content blocking technology in software from several leading security and virus detection manufacturers.

Proponents of content blocking claim that browsing speed can be improved by not downloading slow-loading advertisement banners and buttons. In this regard, slow-loading supplemental content can inhibit browsing of an entire page until the supplemental content either loads or times out. Opponents of content blocking, on the other hand, observe that content blocking amounts to theft, as ad-free surfers use valuable resources of the principal content providers without indirectly "paying" for the principal content by viewing supplemental content such as advertisements. A few principal content publishers have gone so far as to reject content blocking visitors.

If widely embraced, content blocking might result in some important unintended consequences for users of the World Wide Web. For instance, blocking anything that can be easily identified as an advertisement actually may encourage more aggressive revenue-generation models. If legitimate advertising is eliminated, Web sites might feel pressured to sacrifice editorial integrity by using sneaky paid "advertorials" (as has already become the case in the real estate and automobile markets) in which paid advertising masquerades as unbiased editorial opinion. Finally, it is conceivable that if primary content providers no longer receive revenue from supplemental content, they might institute new business models involving subscriptions or per-view fees for serving primary content to users via markup, Presently, technologies exist which unintentionally can be effective in circumventing content blocking. Specifically, uniform resource locator (URL) rewriting has been used to mask the true path to the location of content. Yet, the indiscriminate use of URL rewriting can defeat the effectiveness of caching, the principal mechanism for enhancing the responsiveness of Web pages. Where URL rewriting indiscriminately varies the path to content, the advantages of caching can be lost and network bandwidth can be unnecessarily consumed. Accordingly, URL rewriting in and of itself cannot serve as a solution to the problem of supplemental content being blocked.

SUMMARY OF THE INVENTION

The present invention is a system, method and machine readable storage for circumventing the operation of content blocking logic in a markup language document system. Content which is supplemental to the markup can include not only advertisements (typically in the form of embedded image references), but also embedded references to media, references to other markup language documents, markup language fragments, other types of documents, programs, scripts, and the like. In the method of the invention, the operation of content blocking logic can be determined. Responsive to this determination, a reference to content disposed in markup can be located and the reference to the content can be replaced with an alias. Finally, the markup can be served to a requesting browser. In this way, the replacement of the reference with the alias circumvents the operation of the content blocking logic.

Notably, the process can repeat for subsequent requests for the markup from the same or other browsers. In this regard, the method of the invention further can include, subsequent to the serving step, replacing the alias with a new alias and serving the markup with the new alias to a requesting browser. In a preferred aspect of the invention, the new alias can differ from recently-used aliases according to a reversible formula, or can be selected from a set of aliases in a round robin manner. Furthermore, in a particular embodiment of the invention, a refresh tag can be inserted in the markup to command a refreshing of the markup within a shortened period of time. Consequently, the locating, replacing and serving steps can be performed with a new alias subsequent to the refreshing.

The determining step can include tracking a number of references to content disposed in the markup. The determining step further can include further tracking a number of requests for content produced when rendering the markup. Finally, the determining step can include the step of determining that content blocking has occurred when a difference between the references and the requests exceeds a threshold value. In an alternative embodiment, the determining can include the steps of statistically tracking instances of served content and determining that content blocking has occurred when a particular one of the served supplemental content has not been served as often as indicated by the statistical trackings.

The replacing step can include formulating the alias from the reference, and replacing the reference with the alias. Accordingly, in another specific embodiment of the invention, the formulating step can include encoding the alias as a uniform resource identifier (URI) string. File system delimiters can be interspersed within the encoded string to generate a simulated path to the content. Moreover, a network address for a local file system can be combined with the simulated path. As such, the simulated path and a correlation to the reference can be recorded in an alias table for use when de-referencing the simulated path into the URI.

In more particular illustration, an alias can be formulated from a reference and the reference can be replaced with the alias. To this end, an entry can be created in an alias table to correlate the alias with the location of the actual content. In this way, the actual content can be retrieved responsive to a request for the content based upon the alias. Preferably, the alias can be encoded using only those characters which are permissible in a URI, including, for example, base-64 encoding. Additionally, to the extent that non-permissible characters are included which represent a binary date-time stamp or a counter, such non-permissible characters can be translated into permissible characters.

It will be recognized by the skilled artisan that the alias can be constructed in several different ways, none of which should be interpreted as limiting the scope of the invention. As an example, several optional elements can be used such as the original reference, the actual file system location of the content, file system delimiters and other permissible characters that the alias table can treat as delimiters. These optional elements can be combined in various ways such as by concatenation with each other, with date/time stamps, incremented counters, etc. and then zero or more file system delimiters inserted randomly that make the alias appear to be a normal URI. Ideally the domain name portion of the alias (referring to the supplemental content) should be the same domain name that refers to the primary content. The retrieval of supplemental content in response to a request referencing an alias can be performed with the assistance of an alias translation table, or in accordance with a process configured to transform the alias into the original URI.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for varying, in a markup language document, a reference to supplemental content. References to the supplemental content can be embedded in the markup language content such that upon receipt of the markup language document at a browser, the browser can request the delivery of the referenced supplemental content. Where content blocking is detected in consequence of which one or more of the referenced supplemental content are not requested by the browser, the reference to the blocked supplemental content can be varied in order to circumvent the detected content blocking process.

Figure 1:
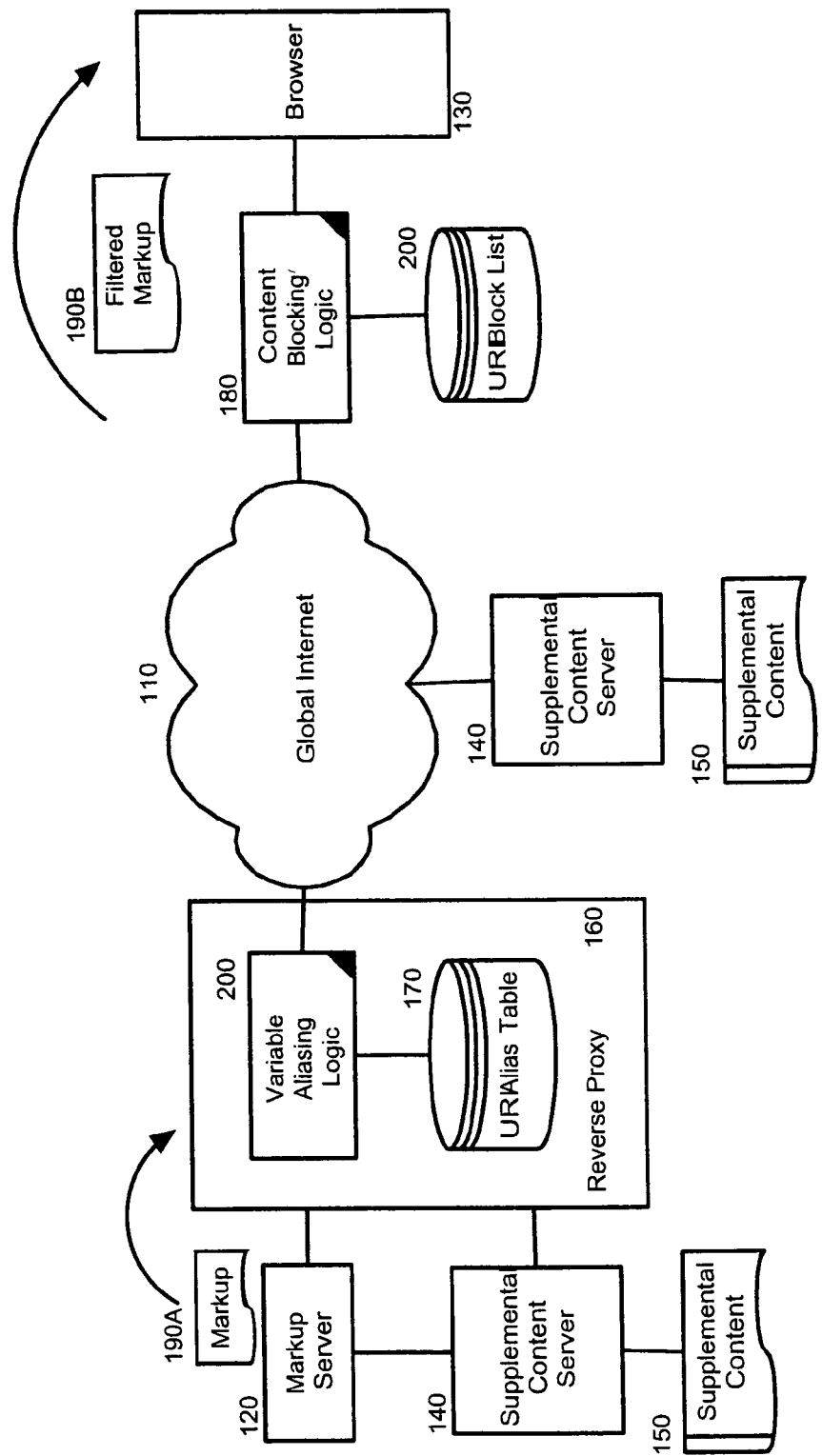
FIG. 1 is a block illustration of a content delivery system which has been configured to vary a reference to supplemental content associated with markup where content blocking has been detected.

FIG. 1 is a block illustration of a markup language document delivery system where content blocking has been detected, which has been configured to vary, in a markup language document, a reference to supplemental content. The delivery system can include a markup language document server 120 coupled to the global Internet 110 over which the markup language document server 120 can serve requested markup 190A to one or more browsers 130 (only one browser shown for illustrative purposes). Notably, one or more of the browsers 130 can be coupled to the global Internet 110 not directly, but through an intermediately positioned forward proxy server (not shown), as is well-known in the art. Still, the precise manner in which a browser requests and retrieves markup 190A over the global Internet 110 is immaterial to the principle of the present invention.

As it has become common in the state of the art, content blocking logic 180 can be communicatively coupled to the browser 130, either directly, or indirectly through a proxy server. The content blocking logic 130 can maintain a list of sources of supplemental content which are deemed undesirable. Typically, the list can include portions of URIs referencing the supplemental content. In any case, the content blocking logic 130 can filter the retrieved markup 190A supplemental content having references whose URI or at least a portion of which has been labeled as undesirable. The resulting filtered markup 190B can be rendered in the browser sans the supplemental content 150 which had been filtered from the retrieved markup 190A by the content blocking logic 180. As an alternative to filtering the markup language document 190A, content blocking logic 180 may reside in the browser 130 and simply avoid fetching, or fetch but not render, supplemental content specified by references in the markup that match entries in a list of undesirable content sources.

The markup server 120 can be coupled to one or more supplemental content servers 140 (only one shown for simplicity of illustration). In addition to the markup server 120, the supplemental content servers 140 further can be coupled directly to the global Internet 110 (and optionally to the reverse proxy 160). Each supplemental content server 140 can be configured to deliver supplemental content 150 on demand and in association with the delivery of markup 190A to browsers 130. Supplemental content 150 can include but is not limited to images, multimedia documents and data, additional markup or markup language fragments, applets, applications, animations, streaming media, and the like. Importantly, in accordance with the inventive arrangements, while the markup server 120 can remain knowledgeable of the path to the supplemental content 150, the knowledge of the path need not be provided in the markup 190A served to the browser 130 over the global Internet 110.

Importantly, a reverse proxy 160, known in the art as a "surrogate" can be coupled to the markup server 120 and to the global Internet 110. As is well known in the art, requests for markup 190A can be routed through the reverse proxy 160, which in turn can serve, or forward as the case may be, the markup 190A to the browser 130 over the global Internet. According to the present invention, however, prior to forwarding the markup 190A to the browser 130, the reverse proxy 160 can relinquish processing to the variable aliasing logic 200 as described herein.

As the content blocking logic 180, whether it resides in same computer as browser 130 or external to browser 130, operates by comparing references to supplemental content against a list, variable aliasing logic 200 disposed in the reverse proxy 160 can be configured to circumvent the operation of the content blocking logic 180 by creating and subsequently varying alias references to the supplemental content 150. More particularly, as an example, the variable aliasing logic can replace the URI referring to supplemental content 150 in the markup 190A with an alias unknown to the content blocking logic 180. The alias can include not only a simulated file system path to the supplemental content 150, but also a domain name of the markup server 120 associated with the primary content and not the domain name of the supplemental content server 140 associated with the supplemental content. In this way, where the content blocking logic 180 may have a configuration for blocking all supplemental content referred to by a URI having a specific file system path or portion thereof, or a specific domain name or portion thereof, or combination of portions of a domain name and file system path, the content blocking logic 180 will unlikely have a configuration for blocking all content from the domain associated with the markup server 120, as it is never the intent of the content blocking logic 180 to prohibit the outright display of the requested markup 190A.

To maintain knowledge of the location of the supplemental content 150, and the knowledge of the alias associated with the supplemental content 150 in the markup 190A, the variable aliasing logic 200 can be coupled to an alias table 170. The alias table 170 can include entries correlating aliases to supplemental content 150. Each time an alias is provided to a browser 130 within requested markup 190A, the variable aliasing logic 200 can ensure that the alias table 170 contains a correlative entry for the alias.

Notably, in an alternative embodiment of the present invention, the variable aliasing logic 200 can be disposed in or associated with the reverse proxy 160. In any case, when the operation of content blocking logic 180 becomes suspected, the variable aliasing logic 200 can vary the alias to the supplemental content 150 unconditionally. In particular, the variable aliasing logic 200 can formulate aliases randomly to generate new aliases periodically, randomly or for each instance when markup 190A has been requested by a browser 130. As performance can lag where the alias table 170 becomes compelled to track a multiplicity of correlations between aliases and supplemental content, round-robin techniques further can be applied in the course of varying the aliases in the markup 190A. Alternatively, a formulaic encoding of the alias based upon all or a portion of the URI of the supplemental content 150 can be applied to reproducibly and reversibly formulate an encoded string which can be formatted into an alias. In such an embodiment, the reversible formulation can be reversed to convert the alias back into a true reference to the supplemental content upon receipt of a request for the supplemental content by means of the alias.

Figure 2:
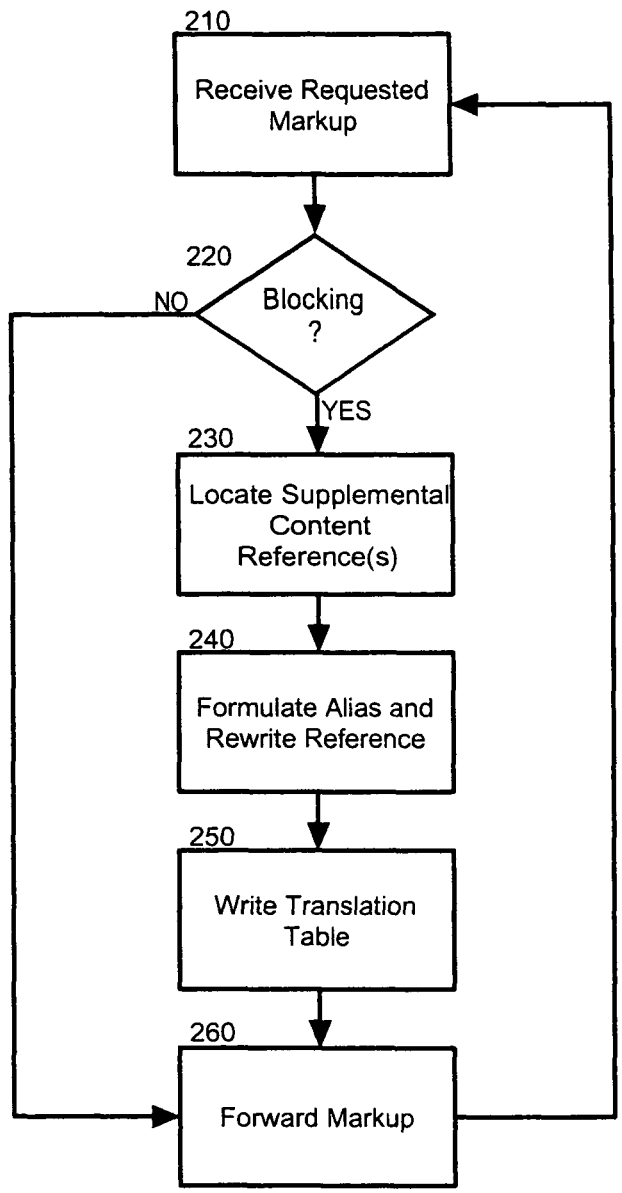
FIG. 2 is a flow chart illustrating a process for varying a reference to supplemental content associated with the markup of FIG. 1; and, FIG. 3 is a flow chart illustrating a process for formulating an alias for use in the reference to the supplemental content of FIG. 1.

FIG. 2 is a flow chart illustrating a process for varying a reference to supplemental content associated with the markup of FIG. 1. Beginning in block 210, a requested markup can be received in the variable aliasing logic. In decision block 220, it can be determined whether the operation of content blocking logic is suspected. The suspicion determination can arise from any one of several techniques, for example comparing the references to supplemental content disposed in the markup to the supplemental content requested. Where a reference is disposed in the markup, but the associated supplemental content has not been requested, it can be presumed that content blocking has occurred. Alternatively, ongoing statistics can be tracked which illustrate trends in delivering supplemental content. Where the number of delivered supplemental content falls short of the statistical norm, it can be presumed that the operation of content blocking logic has inhibited the delivery of the supplemental content.

Notably, a practical system for making the determination can take into consideration that supplemental content may sometimes be retrieved from the browser's local cache, or from the cache of a proxy server interposed somewhere between the browser and the variable aliasing logic, without the browser explicitly requesting the supplemental content from the supplemental content server. A practical system for making the determination can also take into consideration a time-to-live value and other cache control parameters that may be associated with the delivery and caching of the markup-language content and supplemental content. The skilled artisan will note, though, that the exact manner in which the determination is made—e.g., a priori knowledge of a system administrator, direct correlation of references within served markup and subsequent requests for the references, instrumentation, statistics, etc.—is immaterial when ascertaining the scope of this invention.

If in decision block 220 content blocking is not suspected, the markup can be forwarded to the browser 260 and the process can repeat through block 210. Otherwise, in block 230, the markup can be parsed and one or more references to supplemental content can be located therein. For each reference selected for aliasing, an alias can be formulated in block 240. The alias can include both a simulated path to the supplemental content, as well as a domain name sufficient to route a subsequent request for the supplemental content through the variable aliasing logic 200. Subsequently, the alias can be substituted for the reference in the markup. In block 250, a correlative record associating the reference with the alias can be written to the alias table 170. Finally, in block 260 the markup can be forwarded to the browser.

Importantly, in another aspect of the present invention, a refresh tag, well known in the art, can be disposed in the markup so as to force the rendering browser to request a refreshed version of the markup from the markup server. As it is well known, the refresh tag can specify with particularity not only the amount of time which must lapse prior to refreshing the markup, but also the URI for the markup for use in the refreshing process. In any case, according to the present invention, at the time of refreshing, the variation of the aliases in the markup can force the rendering of supplemental content which may have been blocked previously. So, much can be accomplished by varying the references within the refreshed markup using formulated aliases. Alternatively, the refresh tag can reference a different markup language document than the original markup, and the different markup language document can include new aliases.

Figure 3:
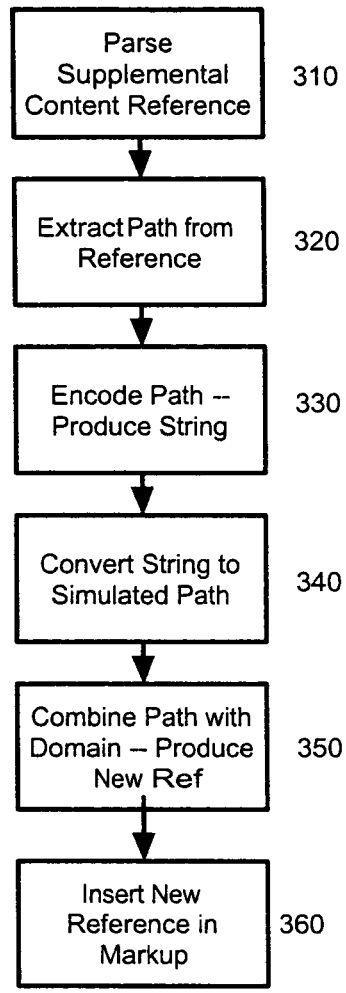

In yet another aspect of the invention, the alias can be generated formulaically through an encoding process. FIG. 3 is a flow chart illustrating a process for generating an alias reference to supplemental content, the reference being contained in a markup language document in accordance with a specific aspect of the present invention. Beginning in block 310, the reference to the supplemental content can be located in the markup through a parsing process. Once located, the URI can be extracted from the reference in block 320. In block 330, the URI can be used as a seed to generate an encoded string, for instance a Base 64 encoded string. In block 340, a simulated path to the supplemental content can be formulated based upon the encoded string. In particular, file location delimeters, such as the "\" character, can be disposed intermittently about the encoded string to produce a simulated path. In block 350 the simulated path, in turn, can be combined with a prefix denoting a protocol-host such as "http://", a domain such as "www.mydomain.com" and a postfix denoting a file type such as ".gif" or ".txt" or ".exe". The resulting reference, for example "http://www.mydomain.com/ab/cdef/ghijk/lmnop.gif" can be disposed in the markup in place of the existing reference in block 360.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method, in a markup language document delivery system, for circumventing an operation of content blocking logic, the method comprising the steps of:
   determining the operation upon content in requested markup of content blocking logic connected to a browser within a client device; and
   in response to the determination of the operation upon the content in the requested markup of the content blocking logic connected to the browser within the client device, circumventing the operation of the content blocking logic by performing the following steps:
      locating in the markup requested by said browser a reference to content blocked by the operation of the content blocking logic;
      replacing in said markup said reference to the blocked content with an alias to the blocked content; and,
      serving said markup with the alias to said browser.

2. The method of claim 1, further comprising the steps of:
   subsequent to said serving step, replacing said alias with a new alias; and,
   serving said markup with said new alias to the requesting browser.

3. The method of claim 2, wherein said new alias is selected from a set of aliases in a round-robin manner.

4. The method of claim 1, further comprising the steps of:
   inserting a refresh tag in said markup to command a refreshing of said markup within a shortened period of time; and,
   performing said locating, replacing and serving steps with a new alias subsequent to said refreshing.

5. The method of claim 1, wherein said determining step comprises the steps of:
   tracking a number of references to content disposed in said markup;
   further tracking a number of requests for content produced when rendering said markup; and,
   determining that content blocking has occurred when a difference between said references and said requests exceeds a threshold value.

6. The method of claim 1, wherein said determining step comprises the steps of:
   statistically tracking instances of served content; and,
   determining that content blocking has occurred when a particular one of said served content has not been served as often as indicated by said statistical trackings.

7. The method of claim 1, wherein said replacing step comprises the steps of:
   formulating said alias from said reference; and, replacing said reference with said alias.

8. The method of claim 7, wherein said formulating step comprises the steps of:
   encoding a string based upon a uniform resource identifier (URI) in said reference;

interspersing at least one file system delimiter in said encoded string to generate a simulated path to supplemental content;

combining a network address for a local file system with said simulated path; and, recording said simulated path and a correlation to said reference in an alias table for use when de-referencing said URI into said simulated path.

9. A computer hardware markup language document delivery system for circumventing an operation of content blocking logic, the system comprising:

a processor executing program configured to:

detect an operation upon content in requested markup of content blocking logic connected to a browser within a client device; and, responsive to detecting the operation of the content blocking logic, replace content references in markup to content blocked by the content blocking logic with aliases for said references to the blocked content in response to the detection of the operation upon the blocked content of the content blocking logic connected to the browser within the client device; and serve said markup with the alias to the browser.

10. The system of claim 9, wherein said processor executing program is communicatively coupled to a reverse proxy.

11. The system of claim 9, further comprising an alias table comprising a plurality of entries, each entry correlating an alias with corresponding content.

12. The system of claim 9, further comprising:

an address encoder having logic for producing an encoded string based upon at least a portion of a reference;

a simulated path formulator coupled to said encoder, said formulator having a configuration for generating a simulated path to supplemental content; and, a translation table configured to store said simulated path and at least a portion of said reference.

13. A machine readable hardware storage device having stored thereon a computer program for circumventing an operation of content blocking logic, the computer program comprising a set of instructions for causing a computer hardware markup language document delivery system to perform the steps of:

determining the operation upon content in requested markup of content blocking logic connected to a browser within a client device; and in response to the determination of the operation upon content in requested markup of the content blocking logic connected to the browser within the client device, circumventing the operation upon content in requested markup of the content blocking logic by performing the following steps:

locating in markup requested by said browser a reference to content blocked by the operation of the content blocking logic;

replacing in said markup said reference to the blocked content with an alias to the blocked content; and, serving said markup with the alias to said browser.

14. The machine readable hardware storage device of claim 13, further comprising the steps of:

subsequent to said serving step, replacing said alias with a new alias; and, serving said markup with said new alias to the requesting browser.

15. The machine readable hardware storage device of claim 14, wherein said new alias is selected from a set of aliases in a round-robin manner.

16. The machine readable hardware storage device of claim 13, further comprising the steps of:

inserting a refresh tag in said markup to command a refreshing of said markup within a shortened period of time; and, performing said locating, replacing and serving steps with a new alias subsequent to said refreshing.

17. The machine readable hardware storage device of claim 13, wherein said determining step comprises the steps of:

tracking a number of references to content disposed in said markup;

further tracking a number of requests for content produced when rendering said markup; and, determining that content blocking has occurred when a difference between said references and said requests exceeds a threshold value.

18. The machine readable hardware storage device of claim 13, wherein said determining step comprises the steps of:

statistically tracking instances of served content; and, determining that content blocking has occurred when a particular one of said served content has not been served as often as indicated by said statistical trackings.

19. The machine readable storage of claim 13, wherein said replacing step comprises the steps of: formulating said alias from said reference; and, replacing said reference with said alias.

20. The machine readable hardware storage device of claim 19, wherein said formulating step comprises the steps of:

encoding a string based upon a uniform resource identifier (URI) in said reference;

interspersing at least one file system delimiter in said encoded string to generate a simulated path to supplemental content;

combining a network address for a local file system with said simulated path; and, recording said simulated path and a correlation to said reference in an alias table for use when de-referencing said URI into said simulated path.

* * * * *